(12) United States Patent
Hollenbeck et al.

(10) Patent No.: US 6,510,355 B1
(45) Date of Patent: Jan. 21, 2003

(54) METHOD FOR PAINT REPAIR IN A REDUCED RETOOLING COST SYSTEM

(75) Inventors: Ronald W. Hollenbeck, Westland, MI (US); Robert G. Walkowiak, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/537,520

(22) Filed: Mar. 29, 2000

(51) Int. Cl.[7] .............................................. G06F 19/00
(52) U.S. Cl. .............................. 700/95; 118/669; 705/7
(58) Field of Search .............................. 700/28, 79, 95, 700/105, 110; 118/669–670; 705/7

(56) References Cited

U.S. PATENT DOCUMENTS 6,141,598 A * 10/2000 Nam ............................ 700/95

* cited by examiner

Primary Examiner—John A. Follansbee
Assistant Examiner—Ronald D Hartman, Jr.

(57) ABSTRACT

A method for reducing retooling costs, particularly relative to painting processes for vehicles. The method includes dividing the order into groups based on color, painting them in color order, and then sequencing them into the original build order. If a paint defect occurs on a vehicle, then it is removed from the optimized product order sequence and repaired. Upon completion of the repair, the repaired vehicle is reinserted back into the optimized product sequence to be repainted. Between each different color, a paint purging process occurs.

13 Claims, 2 Drawing Sheets

METHOD FOR PAINT REPAIR IN A REDUCED RETOOLING COST SYSTEM

TECHNICAL FIELD

The present invention relates generally to assembly processes and, more particularly, to a method for paint repair in a reduced retooling cost assembly process.

BACKGROUND ART

In order to remain successful, many industries that produce consumer goods must produce these goods in approximately the sequence in which they were ordered. If the actual or perceived time to receive a product is higher than customer expectations, then the customer will find alternative, faster producers of a similar product. Therefore, it is in the best interests of producers of consumer goods to constantly strive to produce these goods in approximately the sequence in which they were ordered.

Unfortunately, producing goods in ordered sequence usually results in increased retooling costs. Most producers of large consumer goods have a limited amount of assembly lines available for each product. Generally, there are more versions of a product than there are assembly lines to produce that product. The result is that each time a different version of a product is required, the assembly line tooling must be changed.

One example of this is the painting process in an assembly plant where the process is capable of producing a multitude of different colored vehicles on one assembly line. As different customers order these vehicles, the probability of having multiple vehicles that need to be painted the same color is low. Unfortunately, each time a new color is required, the system needs to be retooled, i.e., the current colored paint in the paint guns needs to be drained and each gun needs to be flushed with paint solvent before the new color can be used. This results in increased material costs because of paint and solvent lost during the purge cycle. Hazardous material cost for disposal of paint and solvent is increased.

Additionally, because of the sensitivity of the painting process to defects caused by contaminants, the presence of some colors of paint will cause defects in subsequently used paint of different colors due to over spray carried onto the next color. Obviously, the more often a new color is required, the more paint and solvent needs to be purged from the spray guns and the more defects occur. This can result in an increase in repairs and the associated waste of solvent and paint to correct the defects. The increase of repairs results in higher costs and can have an impact on the emission of volatile organic compounds (VOC's) to the environment.

One known technique to improve the paint mix is to prioritize the vehicle colors as they were ordered. As each vehicle was ordered, it would be given a special priority in order to increase the number of vehicles built together with the same color. Unfortunately, this "national mix" resulted in negligible success because of small block sizes (i.e. less than 2).

Additionally, when a vehicle needs to be repaired in the paint shop, it is pulled out of sequence and introduced in the beginning the paint shop line where a new color may already be in use. This act of paint repair requires that the current colored paint in the paint guns be drained and flushed with paint solvent before the repair color can be used.

The disadvantages associated with conventional paint repair techniques have made it apparent that a new technique for paint repair in a reduced retooling cost system is needed. The new technique should be able to repair paint defects without requiring paint gun purging and reduce VOC's released into the atmosphere.

SUMMARY OF THE INVENTION

It is an object of the invention to provide an improved and reliable means for paint repair in a reduced retooling cost system, particularly in the painting process for consumer products. Another object of the invention is to repair paint defects without requiring paint gun purging and reduce volatile organic compounds (VOC) released into the atmosphere.

In accordance with the objects of this invention, a method for paint repair in a reduced retooling cost system is provided. In one aspect of the invention, a method for paint repair in a reduced retooling costs system begins by analyzing vehicle orders in a product order sequence to determine the number of different colored vehicles present. The vehicle orders are sorted by color to generate an optimized product order sequence having all like-colored vehicles grouped together. Each group of vehicles is then painted in the order determined by the optimized product sequence. Each vehicle is then inspected for paint defects. If a paint defect occurs on a vehicle, then it is removed from the optimized product order sequence and repaired. Upon completion of the repair, the repaired vehicle is reinserted back into the optimized product sequence to be repainted. Only between each different color group does a paint purging process occur. After the vehicles are painted, they are resorted back into the original product order sequence so that they may be produced in approximately the sequence in which they were ordered.

The present invention achieves an improved and reliable means for paint repair in a reduced retooling cost system. Also, the present invention is advantageous in that it reduces the number of defects caused by changing paint colors. In addition, reduces the VOC's released into the atmosphere and lowers hazardous material disposal costs.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
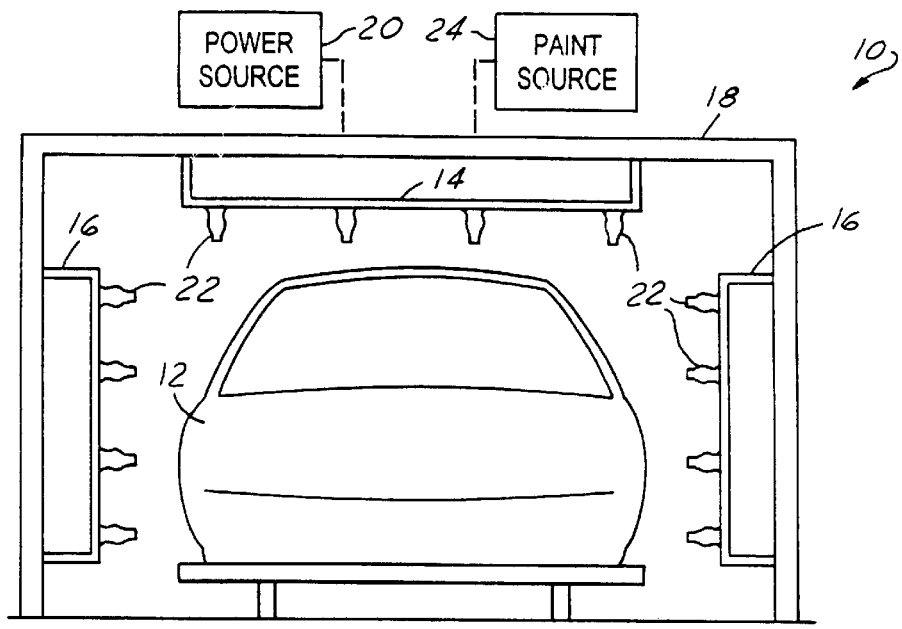
FIG. 1 is a depiction of a paint spray system according to one embodiment of the present invention.

In the following figures, the same reference numerals will be used to identify Identical components in the various views. The present invention is illustrated with respect to a painting process particularly suited for the automotive field. However, the present invention is applicable to various other uses that may require paint repair in a reduced retooling cost system.

Referring to FIG. 1, a paint spray system 10 according to one embodiment of the present invention is illustrated. System 10 includes a plurality of robotic arms that may include an overhead arm 14 and side arms 16. Each arm 14, 16 is coupled to a rack 18. In such systems, arms 14, 16 move according to XYZ coordinates with respect to rack 18. Commonly, the XYZ coordinates of arms 14, 16 vary depending upon the part 12 to be painted. It is common, for example, to maintain a predetermined distance from the surface to be painted. Each arm 14, 16 has a plurality of motors (not shown) that permit movement of the arms 14, 16 into desired positions with respect to part 12. A power source 20 is coupled to paint spray system 10 to power arms 14, 16. Each arm 14, 16 has a paint atomizer head 22 positioned thereon. As will be further described below, each paint atomizer head 22 generates a desired paint spray with respect to part 12. Each paint atomizer head 22 is fluidically coupled to a paint source 24 that supplies paint thereto.

Each time a new color of paint is required, the current color paint present in paint atomizer head 22 needs to be purged. The process of changing paint colors requires several steps. First, paint source 24 is decoupled from paint head 22 and the paint drained. Next, paint head 22 is coupled to a paint solvent and is flushed with the paint solvent until all paint is removed. The paint solvent is then decoupled from paint head 22 and the solvent is drained. Finally, the new paint source 24 is coupled to paint head 22 and paint head 22 is activated until all paint solvent is removed.

Figure 2:
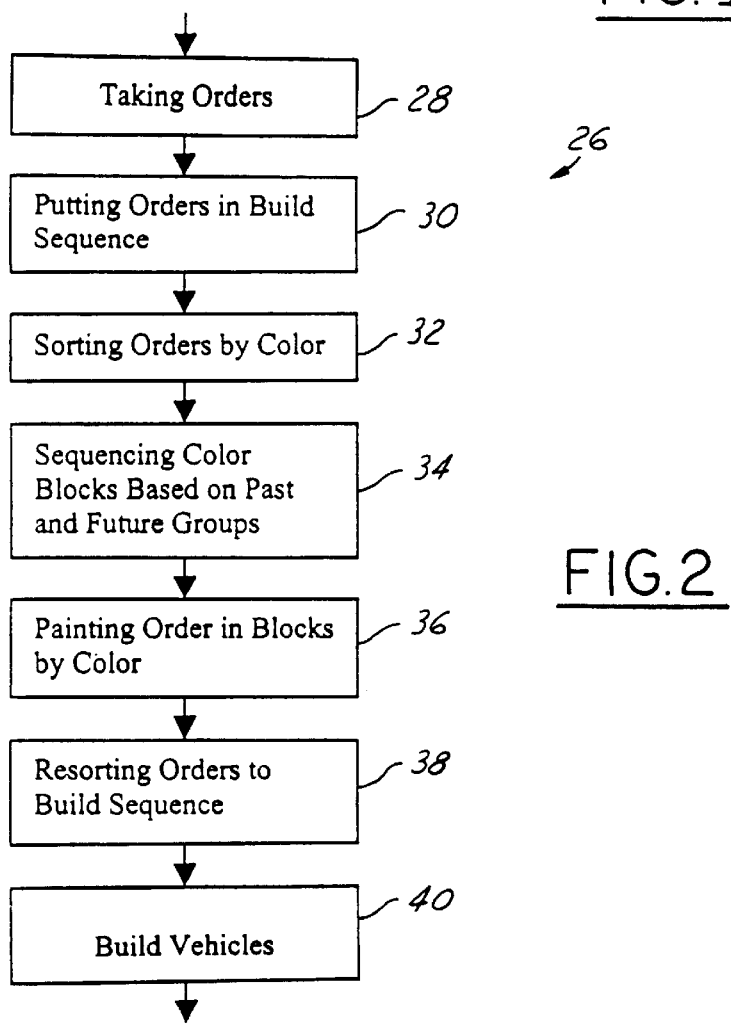
FIG. 2 is a block diagram of a method for reducing retooling costs according to one embodiment of the present invention.

Referring to FIG. 2, a block diagram of a method 26 for reducing retooling costs according to one embodiment of the present invention is illustrated. Method 26 begins with step 28 by offering at least two versions of a consumer product to a plurality of consumers. One example of this would be offering a plurality of different colors of vehicle (such as trucks) to a plurality of consumers. Once these vehicles are offered to the public, a plurality of orders for the consumer products is collected. A product order sequence is then generated based upon the plurality of orders in step 30.

The sequence then proceeds to step 32 where the product order sequence is delivered to an assembly plant. A current portion of the product order sequence is analyzed to determine a current number of different versions of the consumer product included in the current portion. One example of this would be analyzing one hundred current vehicle orders from the product order sequence to determine the number of different colors present in those one hundred orders. This portion is then sorted by version to generate a current optimized product sequence in step 32. The resulting current optimized product sequence groups all of the same versions together. Continuing with the above example, assume that in the one hundred vehicle orders there are fifty white, thirty black, and twenty red trucks randomly distributed among the orders. The current optimized product sequence would group all white trucks together, all black trucks together, and all red trucks together. In this way, the paint line only needs to be retooled (paint purged) twice for one hundred vehicles, instead of after every vehicle.

Figure 3:
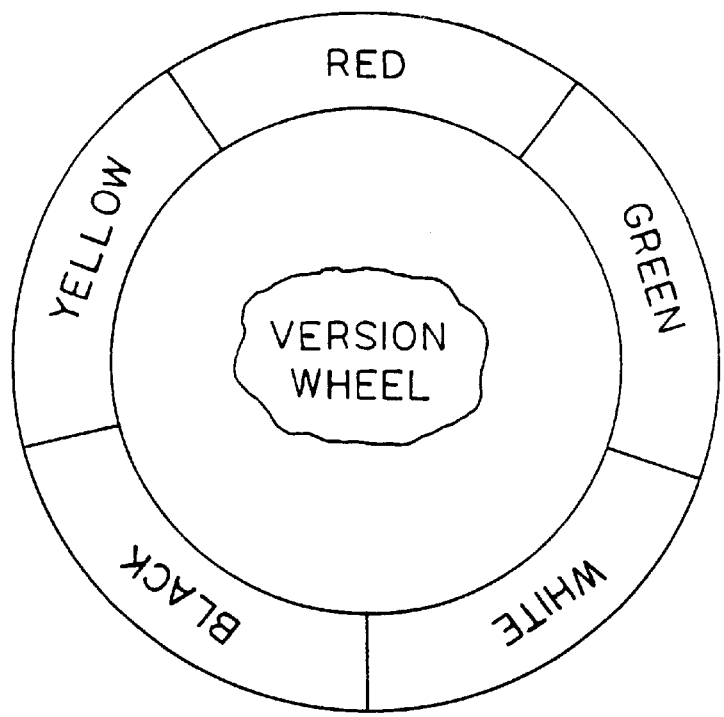
FIG. 3 is a diagram of a version wheel for sorting versions into like groups according to one embodiment of the present invention.

Referring to FIG. 3, a diagram of a version wheel for sorting versions into like groups according to one embodiment of the present invention is illustrated. Once the versions are sorted into like groups, the sequence of the like groups is determined. Because the order sequence selected may not contain all of the versions available in production. A predetermined like group sequence is established. When the prior group is sorted, the ending version determines the starting version for the following group.

In another aspect of the invention, the first and final grouping of the current optimized product sequence may be determined by the past and future optimized product sequences in step 34. Similar to the above process, past and future portions may be analyzed and sorted to generate past and future optimized product sequences. In this way, the first group of the current optimized product sequence is selected to correspond to the final group of the past optimized product sequence. Likewise, the final group of the current optimized product sequence is selected to correspond to the first group of the future optimized product sequence. For example, if the current optimized product sequence begins with a group of vehicles painted red and ends with a group of vehicles painted white, then the previous (past) group would have ended with a group of vehicles painted red and the next (future) group would begin with a group of vehicles to be painted white. In this way, retooling between portions is eliminated.

The sequence then proceeds to step 36 where the consumer products are processed in the order determined by the current optimized product sequence. In the present example, the one hundred vehicles are painted. As each new version is required, the assembly line is retooled. In the present invention, when a new color is required the paint is purged and replaced with the new color paint.

The sequence then proceeds to step 38 where the current optimized product sequence is resorted to approximately the original sequence of the product order sequence. This allows the assembly plant to build vehicles in the sequence in which they were ordered in step 40. In the present invention, as each vehicle is produced it is stored in a storage and retrieval building. After the one hundred vehicles are painted they are resorted to the original sequence and sent to final assembly.

Figure 4:
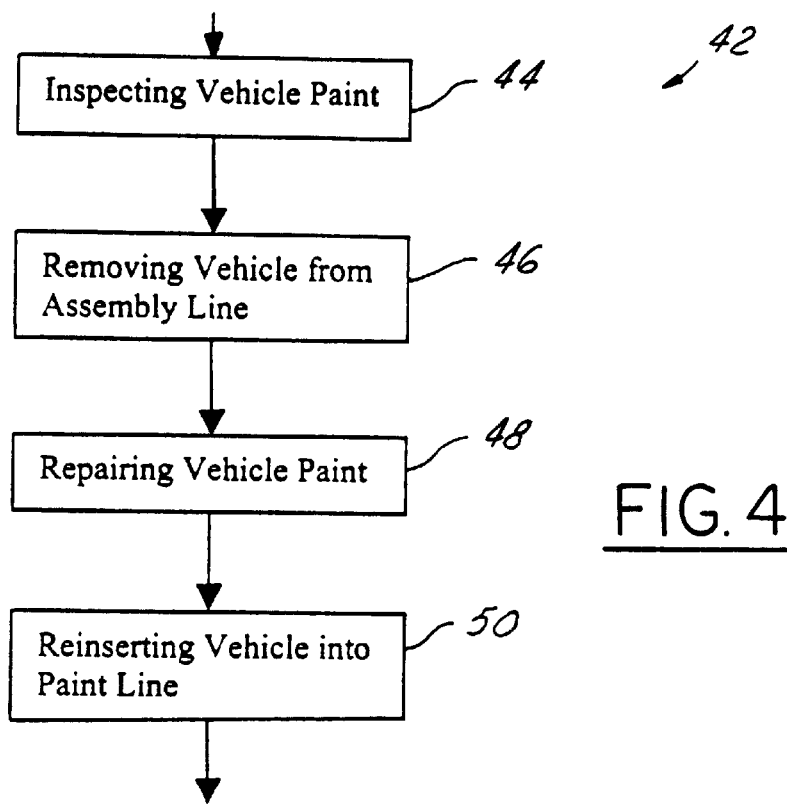
FIG. 4 is a block diagram of a method for paint repair in a reduced retooling cost system according to one embodiment of the present invention.

Referring to FIG. 4, a block diagram of a method 42 for paint repair in a reduced retooling cost system according to one embodiment of the present invention is illustrated. Method 42 for paint repair modifies method 26 for reducing retooling costs by inserting additional steps between step 36 and step 38. In step 44, a recently painted vehicle is inspected for paint defects. If a paint defect is found, then the recently painted vehicle is removed from the paint line in step 46. In step 48, the paint defect is immediately repaired (sanded or filled). The repaired vehicle is then reinserted back onto the paint line for repainting before any change in color can occur in step 48. In an alternative embodiment of the present invention, the paint line is stopped while the recently painted vehicle is repaired to insure that paint color does not change between vehicles.

The method and system of the present invention allows vehicle paint defects to be repaired without requiring paint gun purging. Additionally, the invention reduces emissions of VOC's to the atmosphere and lowers the number of defects caused by changing paint colors.

From the foregoing, it can be seen that there has been brought to the art a new and improved method for paint repair in a reduced retooling cost system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A method for paint repair in a reduced retooling cost system comprising the steps of:

analyzing a current portion of a product order sequence to determine a current number of different versions of a consumer product included in said current portion, wherein said current portion includes at least two versions of said consumer product;

sorting said current portion of said product order sequence to generate a current optimized product sequence, whereby each of said current number of different versions are grouped together;

processing said consumer products in the order determined by said current optimized product sequence;

inspecting at least one of said consumer products for processing defects;

removing a defective consumer product from said current optimized sequence;

repairing said processing defect on said defective consumer product;

reinserting a repaired consumer product back into said current optimized sequence;

reprocessing said repaired consumer product;

retooling an assembly line between said current number of different versions;

resorting said current optimized product sequence back into said product order sequence; and analyzing a past portion of said product order sequence to determine a past number of different versions of said consumer product included in said past portion.

2. The method for paint repair in a reduced retooling cost system as recited in claim 1, further comprising the step of offering said consumer product with said at least two versions to a plurality of consumers.

3. The method for paint repair in a reduced retooling cost system as recited in claim 2, further comprising the step of collecting a plurality of orders for said consumer product from said plurality of consumers.

4. The method for paint repair in a reduced retooling cost system as recited in claim 3, further comprising the step of generating said product order sequence based upon said plurality of orders.

5. The method for paint repair in a reduced retooling cost system as recited in claim 1, further comprising the step of sorting said past portion of said product order sequence to generate a past optimized product sequence, whereby each of said at least two versions are grouped together.

6. The method for paint repair in a reduced retooling cost system as recited in claim 5, wherein a version of a current first group of said current optimized product sequence is the same version as a version of a past final group of said past optimized product sequence.

7. A method for paint repair in a reduced retooling cost system comprising the steps of:

analyzing a current portion of a product order sequence to determine a current number of different versions of a consumer product included in said current portion, wherein said current portion includes at least two versions of said consumer product;

sorting said current portion of said product order sequence to generate a current optimized product sequence, whereby each of said current number of different versions are grouped together;

processing said consumer products in the order determined by said current optimized product sequence;

inspecting at least one of said consumer products for processing defects;

removing a defective consumer product from said current optimized sequence;

repairing said processing defect on said defective consumer product;

reinserting a repaired consumer product back into said current optimized sequence;

reprocessing said repaired consumer product;

retooling an assembly line between said current number of different versions;

resorting said current optimized product sequence back into said product order sequence; and analyzing a future portion of said product order sequence to determine a future number of different versions of said consumer product included in said future portion.

8. The method for paint repair in a reduced retooling cost system as recited in claim 7, further comprising the step of sorting said future portion of said product order sequence to generate a future optimized product sequence, whereby each of said at least two versions are grouped together.

9. The method for paint repair in a reduced retooling cost system as recited in claim 8, wherein a version of a current final group of said current optimized product sequence is the same version as a version of a future first group of said future optimized product sequence.

10. The method for paint repair in a reduced retooling cost system as recited in claim 7, wherein said consumer products are vehicles.

11. The method for paint repair in a reduced retooling cost system as recited in claim 7, wherein said at least two versions comprise paint colors.

12. A method for paint repair in a reduced retooling cost system comprising the steps of:

offering a plurality of consumers a plurality of different colors for a vehicle;

collecting a plurality of orders for said vehicle from said plurality of consumers;

generating a product build order sequence based upon said plurality of orders;

dividing said plurality of orders by paint color;

sorting said plurality of orders into groups based on paint color;

painting said vehicles in the order determined by said current optimized product sequence, wherein a color of a current first group of said current optimized product sequence is the same color as a color of a past final group of a past optimized product sequence;

inspecting one of said vehicles for paint defects to find a defective vehicle;

removing said defective vehicle from said current optimized sequence;

repairing said defective vehicle;

reinserting a repaired vehicle back into said current optimized sequence;

repainting said repaired consumer product;

purging paint between said current number of different colors;

resorting said current optimized product sequence back into said product order sequence; and producing goods in said product order sequence.

13. A method for paint repair in a reduced retooling cost system comprising the steps of:

offering a plurality of consumers thirteen different colors for a vehicle;

collecting a plurality of orders for said vehicle from said plurality of consumers;

generating a product build order sequence based upon said plurality of orders;

dividing said plurality of orders by paint color;

sorting said plurality of orders into groups based on paint color;

painting said vehicles in the order determined by said current optimized product sequence, wherein a color of a current final group of said current optimized product sequence is the same color as a color of a future first group of a future optimized product sequence;

inspecting one of said vehicles for paint defects to find a defective vehicle;

removing said defective vehicle from sad current optimized sequence;

repairing said defective vehicle;

reinserting a repaired vehicle back into said current optimized sequence;

repainting said repaired consumer product;

purging paint between said current number of different colors;

resorting said current optimized product sequence back into said product order sequence; and producing goods in said product order sequence.

\* \* \* \* \*